US012613645B2

(12) United States Patent
Scordino

(10) Patent No.: US 12,613,645 B2
(45) Date of Patent: Apr. 28, 2026

(54) MEMORY CONTROLLER FRACTONAL BANDWIDTH ADJUSTMENT FOR CRITICAL AND NON- CRITICAL COMPONENTS

(71) Applicant: HUAWEI TECHNOLOGIES CO., LTD., Shenzhen (CN)

(72) Inventor: Claudio Scordino, Pisa (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 18/513,211

(22) Filed: Nov. 17, 2023

(65) Prior Publication Data

US 2024/0086093 A1 Mar. 14, 2024

Related U.S. Application Data

(63) Continuation of application No. PCT/EP2021/076936, filed on Sep. 30, 2021.

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS 8,180,975 B2    5/2012    Moscibroda et al.
9,021,493 B2    4/2015    Busaba et al.

(Continued)

FOREIGN PATENT DOCUMENTS

JP      2005258617 A    9/2005
JP      2014026679 A    2/2014
WO      2018130801 A1   7/2018

OTHER PUBLICATIONS

Pellizzoni et al.,"A Predictable Execution Model for COTS-based Embedded Systems," 2011 17th IEEE Real-Time and Embedded Technology and Applications Symposium, total 11 pages, Institute of Electrical and Electronics Engineers, New York, New York (2011).
Kirsch et al., "The Logical Execution Time Paradigm," Springer, total 18 pages (May 10, 2011).
Cavicchioli et al., "Evaluating Controlled Memory Request Injection to Counter PREM Memory Underutilization," 24th Workshop on Job Scheduling Strategies for Parallel Processing (JSSPP 2020), total 20 pages (Apr. 15, 2020).

(Continued)

*Primary Examiner* — Arpan P. Savla
*Assistant Examiner* — Edmund H Kwong
(74) *Attorney, Agent, or Firm* — Leydig, Voit & Mayer, Ltd.

(57) ABSTRACT

A memory controller is provided and configured to control access to a memory with a memory access bandwidth by a plurality of processing components of a data processing system. The memory controller comprises a control unit configured to allocate a respective fraction of the memory access bandwidth to each of the plurality of processing components for accessing the memory by a plurality of memory access operations. Moreover, the memory controller comprises a monitoring unit configured to obtain timing information about a duration of a respective memory access operation by each of the plurality of processing components via a bus of the data processing system. The control unit is further configured to adjust, for one or more of the plurality of processing components, the respective fraction of the memory access bandwidth based on the timing information obtained by the monitoring unit.

20 Claims, 5 Drawing Sheets

(56) References Cited

U.S. PATENT DOCUMENTS

| | | | |
|---|---|---|---|
| 9,075,743 B2 | 7/2015 | Damodaran et al. | |
| 10,268,379 B2 | 4/2019 | Krueger | |
| 10,394,454 B2 | 8/2019 | Krueger | |
| 10,846,251 B1 | 11/2020 | Caccamo et al. | |
| 2009/0217273 A1 | 8/2009 | Mutlu et al. | |
| 2012/0290756 A1 | 11/2012 | Damodaran et al. | |
| 2013/0007370 A1 | 1/2013 | Parikh et al. | |
| 2014/0082625 A1 | 3/2014 | Busaba et al. | |
| 2015/0199141 A1* | 7/2015 | Faulkner | G06F 3/061 |
| | | | 711/103 |
| 2015/0293709 A1* | 10/2015 | Quach | G06F 13/1626 |
| | | | 711/105 |
| 2016/0196231 A1* | 7/2016 | Quach | G06F 11/3433 |
| | | | 710/307 |
| 2017/0177255 A1* | 6/2017 | Xie | G06F 3/0625 |
| 2017/0285682 A1* | 10/2017 | Huang | G06F 1/08 |
| 2018/0203609 A1 | 7/2018 | Krueger | |
| 2018/0203610 A1 | 7/2018 | Krueger | |
| 2019/0050252 A1* | 2/2019 | Arbel | G06F 3/0628 |
| 2019/0319892 A1* | 10/2019 | Ganguli | H04L 41/0896 |
| 2020/0210332 A1* | 7/2020 | Steiner | G06F 11/3495 |

OTHER PUBLICATIONS

Cardona et al., "Maximum-Contention Control Unit (MCCU): Resource Access Count and Contention Time Enforcement," IEEE Design, Automation and Test in Europe Conference and Exhibition, total 6 pages, Institute of Electrical and Electronics Engineers, New York, New York (2019).

Farshchi et al., "BRU: Bandwidth Regulation Unit for Real-Time Multicore Processors," 2020 IEEE Real-Time and Embedded Technology and Applications Symposium (RTAS), total 12 pages, Institute of Electrical and Electronics Engineers, New York, New York (2020).

"Arm® Architecture Reference Manual Supplement, Memory System Resource Partitioning and Monitoring (MPAM), for A-profile architecture," (https://developer.arm.com/documentation/ddi0598/latest), total 432 pages (2018).

Schwäricke et al., "Fixed-Priority Memory-Centric Scheduler for COTS-Based Multiprocessors," 32nd Conference on Real-Time Systems (ECRTS'20), total 24 pages (May 27, 2020).

Sha et al., "Single Core Equivalent Virtual Machines for Hard Real-Time Computing on Multicore Processors," Semantic Scholar, total 17 pages (Nov. 4, 2014).

* cited by examiner

| PartID | Initial MPAM memory bandwidth | Worst-case duration of memory transaction |
|---|---|---|
| #1 | 100% | 110% |
| #2 | 50% | ∞ |
| #3 | 100% | 120% |

*Worst-case durations are expressed with respect to the (interference-free) nominal value obtained during a calibration phase at boot time*

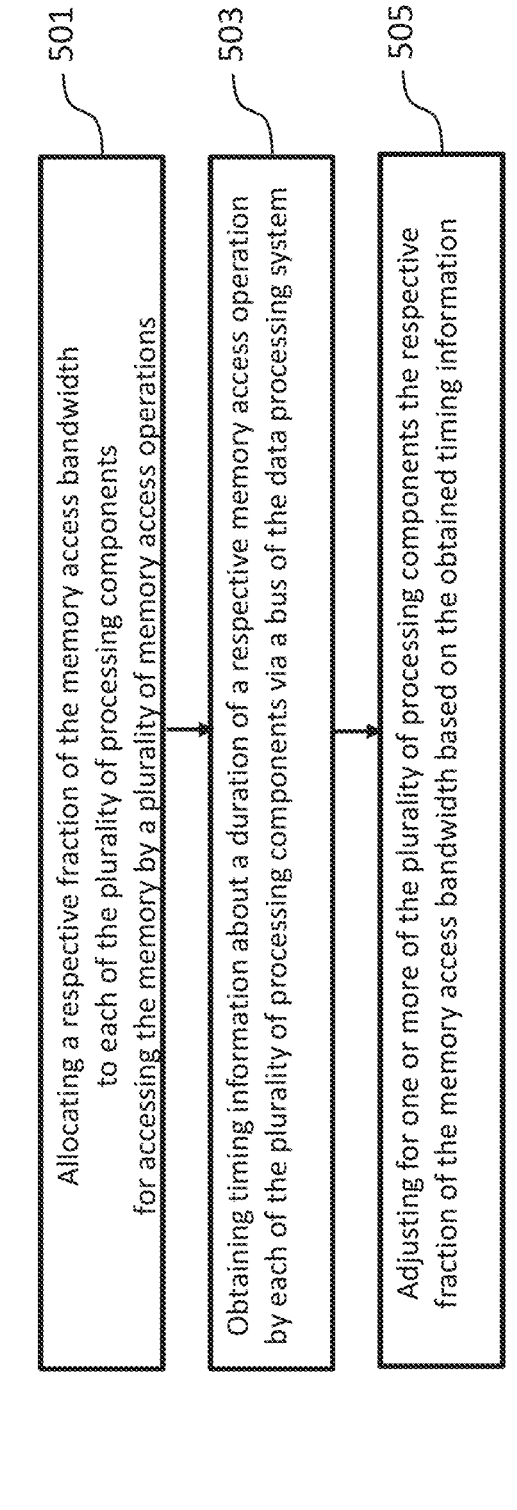

501 Allocating a respective fraction of the memory access bandwidth to each of the plurality of processing components for accessing the memory by a plurality of memory access operations 503 Obtaining timing information about a duration of a respective memory access operation by each of the plurality of processing components via a bus of the data processing system 505 Adjusting for one or more of the plurality of processing components the respective fraction of the memory access bandwidth based on the obtained timing information

MEMORY CONTROLLER FRACTONAL BANDWIDTH ADJUSTMENT FOR CRITICAL AND NON- CRITICAL COMPONENTS

CROSS-REFERENCE TO RELATED APPLICATIONS

This application is a continuation of International Application No. PCT/EP2021/076936, filed on Sep. 30, 2021, the disclosure of which is hereby incorporated by reference in its entirety.

TECHNICAL FIELD

Embodiments of the present disclosure relate to data processing systems, such as a System on a Chip (SoC) comprising a plurality of data processing components with a shared memory. More specifically, the present disclosure relates to a memory controller for such a data processing system as well as a data processing system comprising such a memory controller.

BACKGROUND

Modern integrated data processing systems, such as Systems on a Chip (SoCs) are becoming more and more powerful by enlarging the number of cores and adding ad-hoc accelerators. Often, these modem kind of chip platforms also provide a General-Purpose Graphics Processing Unit (GPGPU) that can be programmed for purposes beyond graphics processing (e.g. Deep Neural Networks). Several industrial domains have a strong interest in using these modern multi-core chips. For example, in the automotive sector there is a trend to reduce recurrent costs by integrating and consolidating multiple functionalities onto a lower number of more powerful Electronic Control Units (ECUs). These functionalities often have different non-functional requirements (e.g. safety level, real-time constraints) which need to be guaranteed also when executed on the integrated system.

Unfortunately, these modern multi-core or heterogeneous chip platforms with shared memories are subject to a phenomenon known as memory interference, which introduces a large degree of timing unpredictability whenever multiple processing units, such as cores and accelerators, try to access the main memory simultaneously. It has been shown that the normalized execution time increases with the number of contending cores if the memory access is uncontrolled.

Thus, memory interference has prevented the usage of such multi-core chip platforms in application domains that require real-time responsiveness, timing predictability and determinism, such as in the automotive field, avionics, robotics, industrial automation and manufacturing. The negative effects of memory interference become even more relevant for the design of mixed-criticality multi-OS software architectures, where multiple operating systems with different safety levels are executed concurrently on the same chip and controlling access to the main memory becomes even harder.

US2018/0203609 and US2018/0203610 disclose a memory controller (referred to as Memory System Resource Partitioning and Monitoring (MPAM) subsystem) allowing to monitor, partition and regulate the usage of memory devices (namely, caches and main memory). Each memory transfer is assigned a PartID (which could refer to either a task, a virtual machine or a core). To control the amount of memory interference, each PartID can be assigned a minimum and maximum memory bandwidth, wherein the minimum bandwidth is enforced in the presence of contention, while the maximum bandwidth is guaranteed only in the absence of contention.

SUMMARY

It is an objective of the present disclosure to provide an improved memory controller for a data processing system comprising a plurality of data processing components with a shared memory as well as a data processing system comprising such a memory controller.

The foregoing and other objectives are achieved by the subject matter of the independent claims. Further implementation forms are apparent from the dependent claims, the description and the figures.

According to a first aspect, a memory controller is provided, wherein the memory controller is configured to control access to a common shared memory, such as a main SDRAM memory, with a maximum memory access bandwidth by a plurality of processing components (also referred to herein as memory clients or PartIDs) of an integrated data processing system, such as a System on a Chip (SoC). The plurality of processing components of the data processing system may comprise one or more CPU cores, one or more hardware accelerators, one or more virtual machines executed on a CPU core, one or more tasks executed on a CPU core or any other hardware and/or software components accessing the common shared memory. The memory controller comprises a control unit configured to allocate a respective fraction of the memory access bandwidth to each of the plurality of processing components for accessing the memory by a plurality of memory access operations, e.g. read or write operations. In an embodiment, the memory controller may comprise Memory System Resource Partitioning and Monitoring (MPAM) subsystem for allocating a respective fraction of the memory access bandwidth to each of the plurality of processing components. Moreover, the memory controller comprises a monitoring unit configured to obtain timing information about a duration of a respective memory access operation by each of the plurality of processing components via a bus of the data processing system. In an embodiment, the bus may be an AMBA (Advanced Microcontroller Bus Architecture) bus. The control unit of the memory controller is further configured to adjust for one or more of the plurality of processing components the respective fraction of the memory access bandwidth based on the timing information obtained by the monitoring unit.

Thus, an improved memory controller is provided allowing to dynamically adapt the memory bandwidths allocated to different processing components of an integrated data processing system.

In a further possible implementation form, the monitoring unit is further configured to determine for a respective memory access operation the processing component, i.e. the identity of performing the respective memory access operation.

In a further possible implementation form, the plurality of processing components comprises one or more critical processing components and one or more non-critical processing components and wherein the control unit is further configured to adjust for the one or more non-critical processing components the respective fraction of the memory access bandwidth based on the timing information obtained by the monitoring unit for the one or more critical processing components.

In a further possible implementation form, the control unit is configured to gradually increase for the one or more non-critical processing components the respective fraction of the memory access bandwidth, if the timing information indicates that the duration of a memory access operation by the one or more critical processing components is smaller than a respective maximum threshold value.

In a further possible implementation form, the control unit is configured to gradually increase for the one or more non-critical processing components the respective fraction of the memory access bandwidth to a value smaller than or equal to a maximum threshold value.

In a further possible implementation form, the control unit is configured to decrease for the one or more non-critical processing components the respective fraction of the memory access bandwidth, if the timing information indicates that the duration of a memory access operation by the one or more critical processing components is longer than a respective maximum threshold value.

In a further possible implementation form, the control unit is configured to decrease the fraction of the memory access bandwidth for the non-critical processing component with the most recent memory access operation.

In a further possible implementation form, the memory controller is configured to operate in a calibration mode and wherein in the calibration mode the control unit is configured to calibrate the respective maximum threshold value for the one or more critical processing components.

In a further possible implementation form, in the calibration mode the control unit is configured to calibrate the respective maximum threshold value for the one or more critical processing components based on a fraction of a respective measured memory access duration for the respective critical processing component.

In a further possible implementation form, the control unit is further configured to determine the one or more critical processing components and the one or more non-critical processing components of the plurality of processing components and/or to obtain information indicative of the one or more critical processing components and the one or more non-critical processing components of the plurality of processing components.

In a further possible implementation form, the control unit is further configured to determine based on the timing information and/or memory access address information obtained by the monitoring unit a first or a second memory access pattern of the plurality of processing components and wherein, in case of the first memory access pattern, the control unit is configured to assign, i.e. control a respective first fraction of the memory access bandwidth to each of the plurality of processing components and, in case of the second memory access pattern, the control unit is configured to assign, i.e. control a respective second fraction of the memory access bandwidth to each of the plurality of processing components.

In a further possible implementation form, the first memory access pattern is a sequential memory access pattern and the second memory access pattern is a random memory access pattern.

According to a second aspect, a data processing system is provided, comprising a memory, a plurality of processing components configured to access the memory by means of one or more memory access operations, and a memory controller according to the first aspect.

According to a third aspect, a method is provided for controlling access of a common memory with a maximum memory access bandwidth by a plurality of processing components of a data processing system. The method comprises the steps of:

allocating a respective fraction of the memory access bandwidth to each of the plurality of processing components for accessing the memory by a plurality of memory access operations, e.g. read or write operations;

obtaining timing information about a duration of a respective memory access operation by each of the plurality of processing components via a bus of the data processing system; and adjusting for one or more of the plurality of processing components the respective fraction of the memory access bandwidth based on the obtained timing information.

The method according to the third aspect of the present disclosure can be performed by the memory controller according to the first aspect of the present disclosure. Thus, further features of the method according to the third aspect of the present disclosure result directly from the functionality of the memory controller according to the first aspect of the present disclosure as well as its different implementation forms described above and below.

According to a fourth aspect a computer program product is provided, comprising a computer-readable storage medium for storing program code which causes a computer or a processor to perform the method according to the third aspect, when the program code is executed by the computer or the processor.

Thus, embodiments disclosed herein allow to define timing requirements of memory transactions of processing components of a data processing system. The duration of memory transactions occurring in the system may be dynamically measured by snooping the memory bus (therefore, also measuring the transfers generated by I/O peripherals through DMA). Whenever a critical memory transaction exceeds its timing requirement, the memory controller may reduce the memory bandwidth of the latest non-critical processing components. If no timing requirement is missed for a sufficient amount of time, the memory controller may gradually increase the bandwidth of non-critical processing components to improve the system efficiency. Embodiments disclosed herein allow a more efficient usage of the memory subsystem, because several processing components are allowed to access the memory simultaneously. Embodiments disclosed herein may be fully implemented in hardware and, thus, do not introduce any computing overhead and may react faster than software implementations for handling memory interference. The memory controller may dynamically adapt settings to different workloads and hardware platforms without human intervention.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 5 is a flow diagram illustrating a method of controlling memory access operations according to an embodiment.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
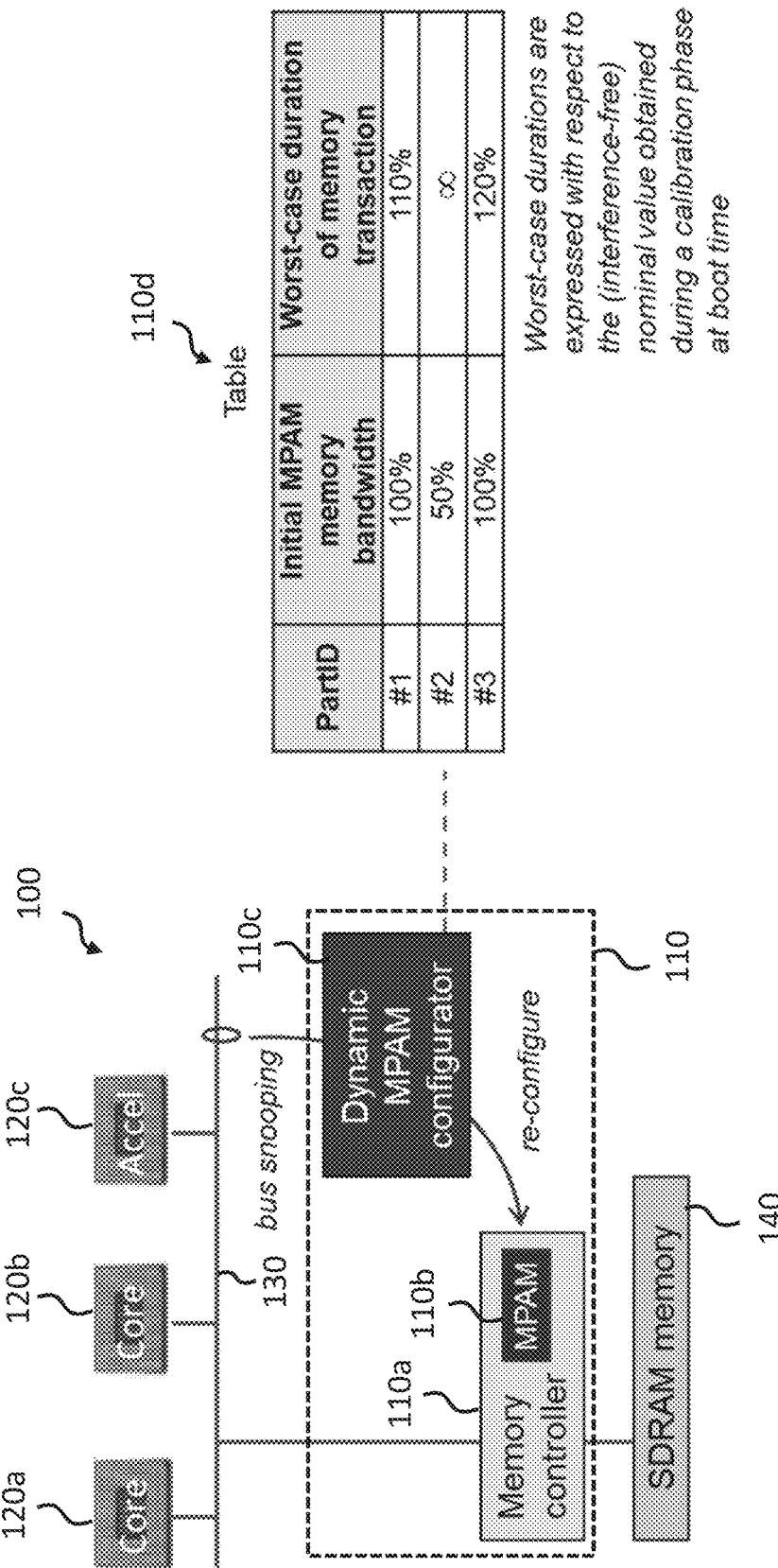
FIG. 1 shows a schematic diagram illustrating a data processing system according to an embodiment including a memory controller according to an embodiment.

FIG. 1 shows a schematic diagram illustrating an integrated data processing system 100 according to an embodiment including a memory controller 110 according to an embodiment. In an embodiment, the integrated data processing system 100 may be a System on a Chip (SoC). In addition to the memory controller 110 the data processing system 100 comprises a plurality of processing components 120a-c, such as a cores 120a, 120b and a hardware accelerator 120c, configured to access a shared memory 140, such as a shared SDRAM memory 140, via a communication bus 130. The plurality of processing components 120a-c are herein referred to also as memory clients or PartIDs. In an embodiment, the bus 130 may be an AMBA (Advanced Microcontroller Bus Architecture) bus 130. In an embodiment, the plurality of processing components 120a-c of the data processing system 100 may comprise one or more CPU cores 120a,b, one or more hardware accelerators 120c, one or more virtual machines executed on a CPU core 120a,b, one or more tasks executed on a CPU core 120a,b or any other hardware and/or software components accessing the common shared memory 140.

As will be described in more detail below, the memory controller 110 is configured to control access to the shared memory 140 with a maximum memory access bandwidth by the plurality of processing components. To this end, the memory controller 110 according to the embodiment shown in FIG. 1 may comprise a conventional memory controller 110a with a Memory System Resource Partitioning and Monitoring (MPAM) subsystem 110b, as disclosed, for instance, in US2018/0203609 and US2018/0203610, which are fully incorporated herein by reference. The conventional memory controller 110a with the MPAM subsystem 110b is configured to allocate a respective fraction of the memory access bandwidth to each of the plurality of processing components 120a-c for accessing the memory 140 by a plurality of memory access operations, e.g. read or write operations. As illustrated in FIG. 1, the memory controller 110 according to an embodiment may further comprise a dynamic MPAM configurator 110c configured to obtain timing information about a duration of a respective memory access operation by each of the plurality of processing components 120a-c via the bus 130 of the data processing system 100. In an embodiment, the dynamic MPAM configurator 110c is further configured to adjust for one or more of the plurality of processing components 120a-c the respective fraction of the memory access bandwidth based on the obtained timing information. In an embodiment, the conventional memory controller 110a with the MPAM subsystem 110b and the dynamic MPAM configurator 110c may be components of a control unit and/or a monitoring unit of the memory controller 110.

Thus, the memory controller 110 according to the embodiment shown in FIG. 1 is configured to dynamically monitor the duration of each memory transaction occurring in the system 100 and dynamically re-program the MPAM subsystem 110b accordingly. As illustrated by table 110d of FIG. 1, the initial settings of the MPAM subsystem 110b as well as the maximum latency of memory transactions associated with one or more of the processing components 120a-c, i.e. PartIDs 120a-c may be initially defined, in particular for those of the plurality of processing components 120a-c identified as critical processing components. Thus, in an embodiment, the plurality of processing components 120a-c may comprise one or more critical processing components and one or more non-critical processing component, wherein the memory controller 110 is further configured to adjust for the one or more non-critical processing components the respective fraction of the memory access bandwidth based on obtained the timing information for the one or more critical processing components. In the exemplary embodiment shown in FIG. 1, the core 120a and the hardware accelerator 120c may be identified as critical processing components, while the core 120b is identified as a non-critical processing component.

Figure 2:
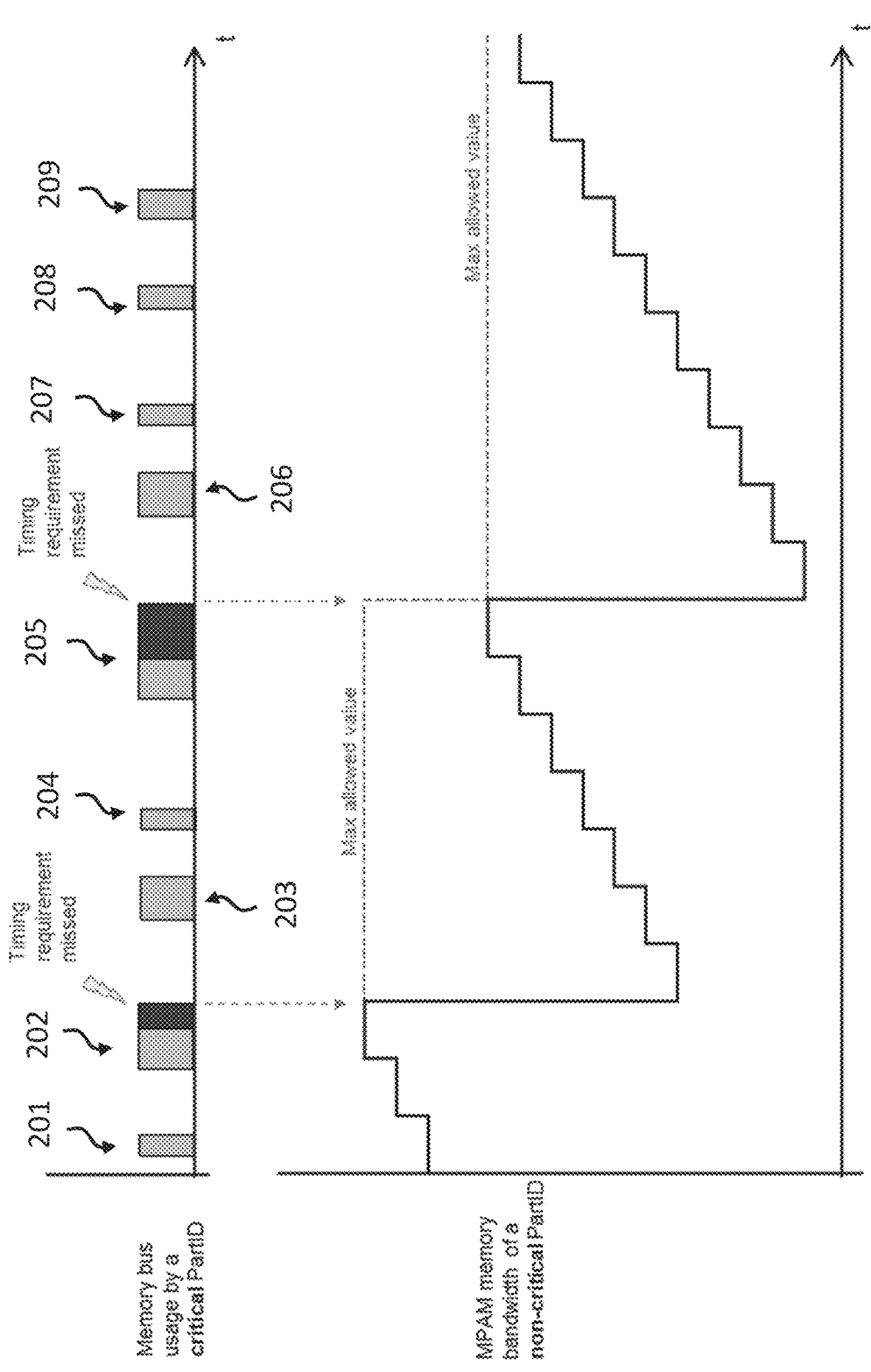
FIG. 2 shows a timing diagram illustrating memory access operations controlled by a memory controller according to an embodiment.

FIG. 2 shows a timing diagram illustrating a plurality of memory access operations 201-209 of a critical processing component, such as the core 120a. As illustrated in FIG. 2, whenever a memory transaction of the critical processing component 120a exceeds its timing requirement (such as for the exemplary memory transactions 202 and 205 shown in FIG. 2), the memory controller 110 according to an embodiment is configured to reduce the memory bandwidth of one or more non-critical processing components, such as the core 120b, associated with the one or more most recent memory transactions of a non-critical processing component in the system 100. If no timing requirement is missed for a sufficient amount of time (such as the time interval between the memory transactions 202 and 205 or the time interval after the memory transaction 205 in FIG. 2), the memory controller 110 according to an embodiment is configured to gradually (e.g. in a step-wise manner) increase the memory bandwidth of one or more non-critical processing components to improve the system efficiency.

Figure 3:
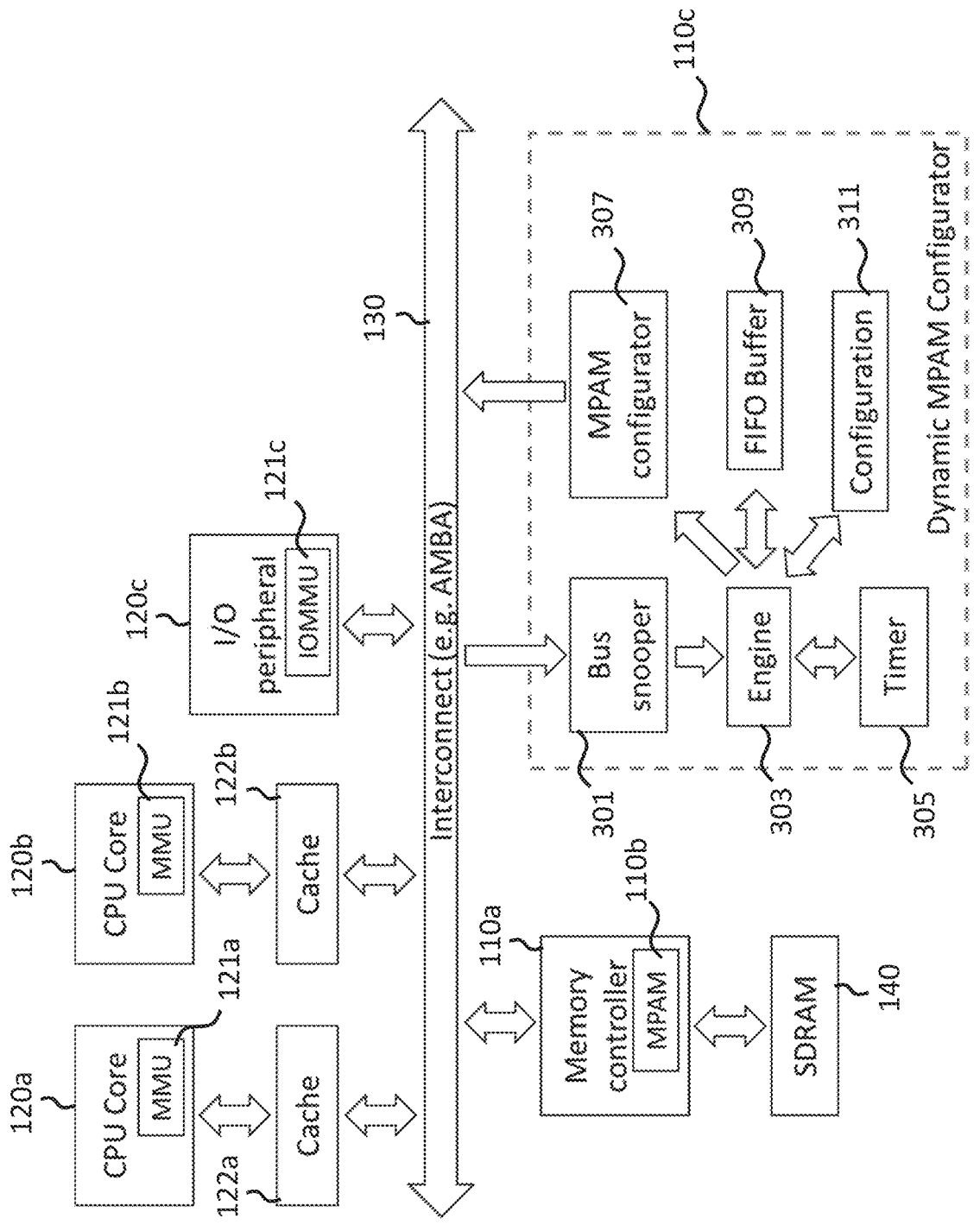
FIG. 3 shows a schematic diagram illustrating more details of a data processing system according to an embodiment including a memory controller according to an embodiment.

FIG. 3 shows a schematic diagram illustrating the data processing system 100 according to a further embodiment. In the embodiment shown in FIG. 3, the CPU cores 120*a,b* of the data processing system 100 may comprise a respective memory management unit (MMU) 121*a,b* and may be connected to private cache memories 122*a,b*. Likewise, the hardware accelerator 120*c* may comprise an IO memory management unit (IOMMU). In the embodiment shown in FIG. 3, the dynamic MPAM configurator 110*c* of the memory controller 110 may comprise a bus snooper 301 for monitoring the AMBA bus 130 for memory transactions, an engine 303 for controlling the components of the dynamic MPAM configurator 110*c*, a timer 305, e.g. a clock 305 for obtaining the timing information by measuring both the duration of the memory access operations by the processing components 120*a-c* and the amount of time during which no timing violation of the critical components 120*a-c* has occurred, a MPAM configurator 307 for programming the MPAM controller 110*b* by reading/writing its registers, a FIFO buffer 309 for storing information about the latest memory transactions snooped on the AMBA bus 130 and a configuration 311 for storing the initial and the current configuration of the dynamic MPAM configurator 110*c*.

Figure 4:
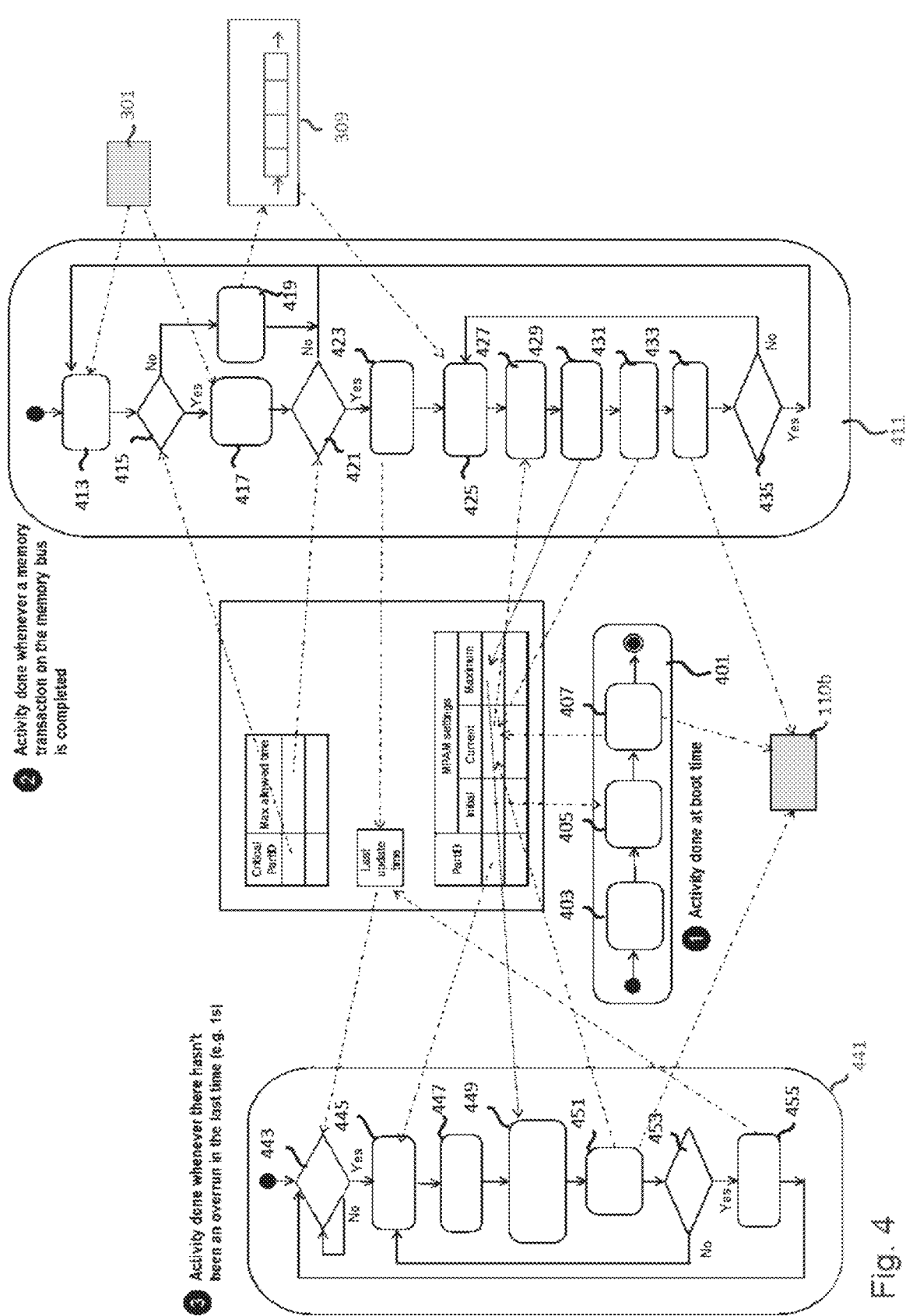
FIG. 4 shows a schematic diagram illustrating different processing steps implemented by a data processing system according to an embodiment including a memory controller according to an embodiment.

FIG. 4 shows a schematic diagram illustrating different processing steps implemented by the data processing system 100 according to an embodiment including the memory controller 110 according to an embodiment. More specifically, FIG. 4 illustrates processing steps implemented by the data processing system 100 and the memory controller 110 according to an embodiment during three different main stages, namely processing steps 401 performed at boot time (i.e. initial configuration and calibration), processing steps 411 performed whenever a memory transaction occurs on the memory bus 130 (including adjustment of the bandwidths by the memory controller 110 in case of a timing violation), and processing steps 441 performed by the memory controller 110 whenever there has not been any recent timing requirement violation (i.e. timer expiration and gradual increase of the bandwidths for the non-critical processing components).

As illustrated in FIG. 4, during boot time 401 the memory controller 110 may be configured to perform the following steps. In a step 403 the memory controller 110 may perform a calibration phase measuring the nominal (interference-free) durations of memory operations for the processing components 120*a-c*. In a step 405 the memory controller 110 may obtain initial settings of the conventional memory controller 110*a* with the MPAM subsystem 110*b*, i.e. the MPAM settings and allocate the memory bandwidths of the processing components 120*a-c* in accordance therewith (step 407). As will be appreciated, this allows, for instance, a user to specify those processing components 120*a-c* of the data processing system 100 that are time critical. For each time-critical processing component 120*a-c*, the memory controller 110 may allow to specify the requirement of the maximum duration of the memory transaction as a percentage with respect to a nominal (interference-free) value obtained during the calibration phase at boot time (e.g. 110%).

As illustrated in FIG. 4, whenever a memory transaction occurs on the memory bus 130 (including adjustment of the bandwidths by the memory controller 110 in case of a timing violation) the memory controller 110 may be configured to perform the following steps. For each memory transaction monitored on the bus 130 (for instance, by the bus snooper 301 of the memory controller 110) the memory controller 110 may obtain the identity of corresponding processing component 120*a-c* (step 413). If the memory transaction is related to a processing component 120*a-c* which is marked as critical, then the memory controller 110 may also compute the duration of the memory transaction (steps 415 and 417). If, instead, the memory transaction is related to a processing component 120*a-c* which is marked as non-critical, then the memory controller 110 may store the identity of the corresponding processing component 120*a-c* in the FIFO buffer 309 containing a list of the latest non-critical memory transactions happened in the system 100 (steps 415 and 419). Whenever a memory transaction of a critical processing component 120*a* exceeds the timing requirement (step 421), the memory controller 110 resets the timer 305 used to measure the amount of time for which there has not been any timing requirement violation (step 423). The memory controller 110 then retrieves from the FIFO buffer 309 the list of the non-critical processing components 120*a-c* associated with the one or more most recent memory transactions (step 425). For each of the retrieved processing components 120*a-c*, the memory controller 110 then retrieves the respective current bandwidth setting (step 429), reduces it by a certain configurable amount (e.g. by 10%) (step 431) and programs the MPAM subsystem 110*b* accordingly.

As illustrated in FIG. 4, whenever there has not been any timing requirement violation for a sufficient configurable amount of time (e.g. 10 seconds), as checked by steps 443 and 455, the memory controller 110 may be configured to perform the following steps. For each non-critical processing component (steps 445 453) the memory controller 110 is configured to obtain the current bandwidth setting of the respective non-critical processing component 120*a-c* (step 447) and to gradually increase the memory bandwidth of the respective non-critical processing component 120*a-c* by a certain configurable amount (e.g. 1%) to improve the system efficiency (steps 449 and 451). The new bandwidth value should be strictly lower than the value that was registered when a memory transaction exceeded the timing requirement.

In an embodiment, the memory controller 110 is further configured to determine based on the timing information and/or memory access address information obtained by the bus snooper 301 a first or a second memory access pattern of the plurality of processing components 120*a-c*, such as a sequential memory access pattern and a random memory access pattern. In case of the first memory access pattern, the memory controller 110 is configured to assign a respective first fraction of the memory access bandwidth to each of the plurality of processing components 120*a-c* and, in case of the second memory access pattern, the memory controller 110 is configured to assign a respective second fraction of the memory access bandwidth to each of the plurality of processing components 120*a-c*.

FIG. 5 is a flow diagram illustrating a method 500 according to an embodiment for controlling access of the memory 140 with a memory access bandwidth by the plurality of processing components 120a-c of the data processing system 100. The method 500 comprises a step 501 of allocating a respective fraction of the memory access bandwidth to each of the plurality of processing components 120a-c for accessing the memory 140 by a plurality of memory access operations. Moreover, the method 500 comprises a step 503 of obtaining timing information about a duration of a respective memory access operation by each of the plurality of processing components 120a-c via the bus 130 of the data processing system 100. The method 500 further comprises a step 505 of adjusting for one or more of the plurality of processing components 120a-c the respective fraction of the memory access bandwidth based on the obtained timing information.

The method 500 can be performed by the memory controller 110 and/or the data processing system 100 according to an embodiment. Thus, further features of the method 500 result directly from the functionality of the memory controller 110 and/or the data processing system 100 as well as the different embodiments thereof described above and below.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

What is claimed is:

1. A memory controller for controlling access to a memory with a memory access bandwidth by a plurality of processing components of a data processing system, wherein the memory controller comprises:

a controller configured to allocate a respective fraction of the memory access bandwidth to each of the plurality of processing components for accessing the memory by a plurality of memory access operations;

a monitor device configured to obtain timing information about a duration of a respective memory access operation by each of the plurality of processing components via a bus of the data processing system;

wherein the controller is further configured to adjust, for one or more of the plurality of processing components, the respective fraction of the memory access bandwidth based on the timing information obtained by the monitor device;

wherein based on a memory access operation for a critical processing component having exceeded a corresponding timing requirement, the controller is further configured to:

register one or more current bandwidth values of corresponding one or more non-critical processing components associated with most recent transactions, as corresponding one or more maximum bandwidth values;

reduce, by a configurable amount, the one or more current bandwidth values of the corresponding one or more non-critical processing components associated with the most recent transactions; and wherein each identity of the one or more non-critical processing components associated with the most recent transactions is recorded in a list stored in a first-in-first-out (FIFO) buffer, and the controller is configured to retrieve the list from the FIFO buffer and determine the configurable amount based on the list and a respective current bandwidth setting.

2. The memory controller of claim 1, wherein the monitor device is further configured to determine, for a respective memory access operation, the processing component performing the respective memory access operation.

3. The memory controller of claim 1, wherein the plurality of processing components comprises:

one or more critical processing components and one or more non-critical processing components, and wherein the controller is further configured to adjust, for the one or more non-critical processing components, the respective fraction of the memory access bandwidth based on the timing information obtained by the monitor device for the one or more critical processing components.

4. The memory controller of claim 3, wherein the controller is configured to increase, for the one or more non-critical processing components, the respective fraction of the memory access bandwidth, based on the timing information indicating that the duration of a memory access operation by the one or more critical processing components is smaller than a respective threshold value.

5. The memory controller of claim 4, wherein the controller is configured to increase, for the one or more non-critical processing components, the respective fraction of the memory access bandwidth to a value smaller than or equal to a maximum threshold value.

6. The memory controller of claim 3, wherein the controller is configured to decrease, for the one or more non-critical processing components, the respective fraction of the memory access bandwidth, based on the timing information indicating that the duration of a memory access operation by the one or more critical processing components is longer than a respective threshold value.

7. The memory controller of claim 6, wherein the controller is configured to decrease the fraction of the memory access bandwidth for the non-critical processing component with the most recent memory access operation.

8. The memory controller of claim 6, wherein the memory controller is configured to operate in a calibration mode, and wherein during the calibration mode, the controller is configured to calibrate the respective threshold value for the one or more critical processing components.

9. The memory controller of claim 8, wherein during the calibration mode, the controller is configured to calibrate the respective threshold value for the one or more critical processing components based on a fraction of a respective measured memory access duration for the respective critical processing component.

10. The memory controller of claim 5, wherein the controller is further configured to determine the one or more critical processing components and the one or more non-critical processing components of the plurality of processing components; and/or to obtain information indicative of the one or more critical processing components and the one or more non-critical processing components of the plurality of processing components.

11. The memory controller of claim 1, wherein the controller is further configured to determine, based on the timing information and/or memory access address information obtained by the monitor device a first or a second memory access pattern of the plurality of processing components, and wherein, in response to the first memory access pattern being determined, the controller is configured to assign a respective first fraction of the memory access bandwidth to each of the plurality of processing components, and wherein in response to the second memory access pattern being determined, the controller is configured to assign a respective second fraction of the memory access bandwidth to each of the plurality of processing components.

12. The memory controller of claim 11, wherein the first memory access pattern is a sequential memory access pattern, and the second memory access pattern is a random memory access pattern.

13. A data processing system, comprising:

a memory;

a plurality of processing components configured to access the memory by one or more memory access operations; and a memory controller for controlling access to a memory with a memory access bandwidth by a plurality of processing components of a data processing system, wherein the memory controller comprises:

a controller configured to allocate a respective fraction of the memory access bandwidth to each of the plurality of processing components for accessing the memory by a plurality of memory access operations;

a monitor device configured to obtain timing information about a duration of a respective memory access operation by each of the plurality of processing components via a bus of the data processing system;

wherein the controller is further configured to adjust, for one or more of the plurality of processing components, the respective fraction of the memory access bandwidth based on the timing information obtained by the monitor device;

wherein based on a memory access operation for a critical processing component having exceeded a corresponding timing requirement, the controller is further configured to:

register one or more current bandwidth values of corresponding one or more non-critical processing components associated with most recent transactions, as corresponding one or more maximum bandwidth values;

reduce, by a configurable amount, the one or more current bandwidth values of the corresponding one or more non-critical processing components associated with the most recent transactions; and wherein each identity of the one or more non-critical processing components associated with the most recent transactions is recorded in a list stored in a first-in-first-out (FIFO) buffer, and the controller is configured to retrieve the list from the FIFO buffer and determine the configurable amount based on the list and a respective current bandwidth setting.

14. A method for controlling access of a memory with a memory access bandwidth by a plurality of processing components of a data processing system, wherein the method which is applied to a memory controller comprises:

allocating a respective fraction of the memory access bandwidth to each of the plurality of processing components for accessing the memory by a plurality of memory access operations;

obtaining timing information about a duration of a respective memory access operation by each of the plurality of processing components via a bus of the data processing system; and adjusting for one or more of the plurality of processing components the respective fraction of the memory access bandwidth based on the obtained timing information;

wherein based on a memory access operation for a critical processing component having exceeded a corresponding timing requirement, the method further comprises:

registering one or more current bandwidth values of corresponding one or more non-critical processing components associated with most recent transactions, as corresponding one or more maximum bandwidth values;

reducing, by a configurable amount, the one or more current bandwidth values of the corresponding one or more non-critical processing components associated with the most recent transactions; and wherein each identity of the one or more non-critical processing components associated with the most recent transactions is recorded in a list stored in a first-in-first-out (FIFO) buffer, and the controller is configured to retrieve the list from the FIFO buffer and determine the configurable amount based on the list and a respective current bandwidth setting.

15. A non-transitory computer-readable storage medium for storing program code which, upon execution by a computer or a processor, causes the computer or the processor to perform the method of claim 14.

16. The data processing system of claim 13, wherein the monitor device is further configured to determine, for a respective memory access operation, the processing component performing the respective memory access operation.

17. The data processing system of claim 13, wherein the plurality of processing components comprises:

one or more critical processing components and one or more non-critical processing components, and wherein the controller is further configured to adjust, for the one or more non-critical processing components, the respective fraction of the memory access bandwidth based on the timing information obtained by the monitor device for the one or more critical processing components.

18. The data processing system of claim 13, wherein the controller is configured to increase, for the one or more non-critical processing components, the respective fraction of the memory access bandwidth, based on the timing information indicating that the duration of a memory access operation by the one or more critical processing components is smaller than a respective threshold value.

19. The method of claim 14, further comprising:

determining, for a respective memory access operation, the processing component performing the respective memory access operation.

20. The method of claim 14, wherein the plurality of processing components comprises:

one or more critical processing components and one or more non-critical processing components, and wherein the method further comprises: adjusting, for the one or more non-critical processing components, the respective fraction of the memory access bandwidth based on the obtained timing information for the one or more critical processing components.

* * * * *